United States Patent
Brandon et al.

(10) Patent No.: US 6,717,281 B1
(45) Date of Patent: Apr. 6, 2004

(54) ELECTRIC GENERATOR AND MOTOR DRIVE SYSTEM

(76) Inventors: Dennis Brandon, 5114 Woodland Hills Dr., Brentwood, TN (US) 37027; Allan Flack, 20203 Crowne Brook Cir., Franklin, TN (US) 37067

( * ) Notice: Subject to any disclaimer, the term of this patent is extended or adjusted under 35 U.S.C. 154(b) by 0 days.

(21) Appl. No.: 09/697,524

(22) Filed: Oct. 26, 2000

(51) Int. Cl.[7] ............ B60K 6/00; F02N 11/06; H02P 9/04
(52) U.S. Cl. ............ 290/40 C; 180/65.2
(58) Field of Search ............ 290/40 C, 40 A, 290/40 B, 30 R; 180/65.3, 65.4, 65.2; 56/10.6, 10.7, 11.9, DIG. 15; 172/42, 123

(56) References Cited

U.S. PATENT DOCUMENTS

| | | |
|---|---|---|
| 411,196 A | 9/1889 | Huntington |
| 571,392 A | 11/1896 | Plass |
| 583,018 A | 5/1897 | Baker |
| 583,749 A | 6/1897 | Hertel |
| 585,251 A | 6/1897 | Bird |
| 607,318 A | 7/1898 | Worth |
| 632,278 A | 9/1899 | Plass |
| 654,716 A | 7/1900 | Cowles |
| 696,596 A | 4/1902 | Robinson |
| 725,860 A | 4/1903 | Morton |
| 968,521 A | 8/1910 | Baird |
| 1,147,669 A | 7/1915 | Avery |
| 1,214,643 A | 2/1917 | Boker |
| 1,227,016 A | 5/1917 | Sturm |
| 1,386,874 A | 8/1921 | Judson |
| 1,641,802 A | 9/1927 | Danly |
| 2,023,716 A | 12/1935 | Thompson |
| 2,647,025 A | 7/1953 | Deffenbaugh |
| 3,035,385 A | 5/1962 | Lill |
| 3,038,288 A | 6/1962 | Deptula et al. |
| 3,059,397 A | 10/1962 | Anderson et al. |
| 3,327,546 A | 6/1967 | Gordon et al. |
| 3,445,991 A | 5/1969 | Hanson et al. |
| 3,529,482 A | 9/1970 | Jackson et al. |
| 3,613,814 A | 10/1971 | Prien, Jr. |

(List continued on next page.)

FOREIGN PATENT DOCUMENTS

JP 405023031 A * 2/1993

*Primary Examiner*—Tran Nguyen
*Assistant Examiner*—Julio Gonzalez R.
(74) *Attorney, Agent, or Firm*—W. Edward Ramage

(57) ABSTRACT

A drive system which integrates an electric generator, one or more electric motors and an electronic control module is configured as a variable speed drive in either single, dual or four wheeled traction drive configurations for a vehicle. The generator is mechanically driven by the output shaft of an internal combustion engine to generate the electrical power for energizing the electric motors. A central computer in the electronic control module controls the output voltage of the generator and the speed and torque of each of the motors in the drive system. The speed input signal for the motors can be analog signals that come from sources such as a joystick, a potentiometer mounted on a steering wheel, control panel, foot pedal or remote location or digital signals from a digital device. Position/speed detectors on each motor and the generator send signals back to the central computer for closed-loop control of the generator and of the motors. The generator supplies the DC voltage to the power control board for each motor as commanded by the central computer. The rotor of each motor is connected to a gearbox for speed reduction and increased torque that is applied to the wheel mounted on the output shaft of the gearbox. When the motors are not being driven, the generator may optionally supply DC power to the input of an inverter that has an output to standard electric utility AC outlets that can be used to power auxiliary equipment.

17 Claims, 9 Drawing Sheets

U.S. PATENT DOCUMENTS

| | | | |
|---|---|---|---|
| 3,631,730 A | | 1/1972 | Hadler et al. |
| 3,667,304 A | | 6/1972 | Puffer et al. |
| 3,706,363 A | | 12/1972 | Niles |
| 3,736,732 A | * | 6/1973 | Jennings et al. .............. 56/10.9 |
| 3,892,446 A | | 7/1975 | Rich, Jr. |
| 3,995,709 A | | 12/1976 | Gil |
| 4,012,677 A | * | 3/1977 | Rist et al. ...................... 290/14 |
| 4,241,577 A | * | 12/1980 | Baldauf ........................ 60/420 |
| 4,262,239 A | * | 4/1981 | Kawa .......................... 318/561 |
| 4,319,467 A | | 3/1982 | Hegler et al. |
| 4,395,245 A | | 7/1983 | Carlson |
| 4,399,886 A | * | 8/1983 | Pollman .................... 180/197 |
| 4,407,517 A | | 10/1983 | Neyer |
| 4,415,049 A | | 11/1983 | Wereb |
| 4,461,958 A | * | 7/1984 | Krohling et al. ............... 290/45 |
| 4,498,552 A | | 2/1985 | Rouse |
| 4,546,844 A | * | 10/1985 | Stauffer ....................... 180/243 |
| 4,840,385 A | | 6/1989 | Senft et al. |
| 4,951,769 A | * | 8/1990 | Kawamura ................. 180/65.4 |
| 4,992,920 A | * | 2/1991 | Davis .......................... 322/32 |
| 5,353,578 A | | 10/1994 | Irby et al. |
| 5,743,347 A | | 4/1998 | Gingerich |
| 5,857,315 A | | 1/1999 | Keane |
| 6,054,834 A | * | 4/2000 | Ha .............................. 318/685 |
| 6,082,084 A | * | 7/2000 | Reimers et al. ............... 56/11.9 |
| 6,109,009 A | * | 8/2000 | Benson .................. 56/10.2 G |
| 6,278,915 B1 | * | 8/2001 | Deguchi et al. ........... 180/65.2 |
| 6,376,955 B1 | * | 4/2002 | Arimitsu ..................... 310/114 |

\* cited by examiner

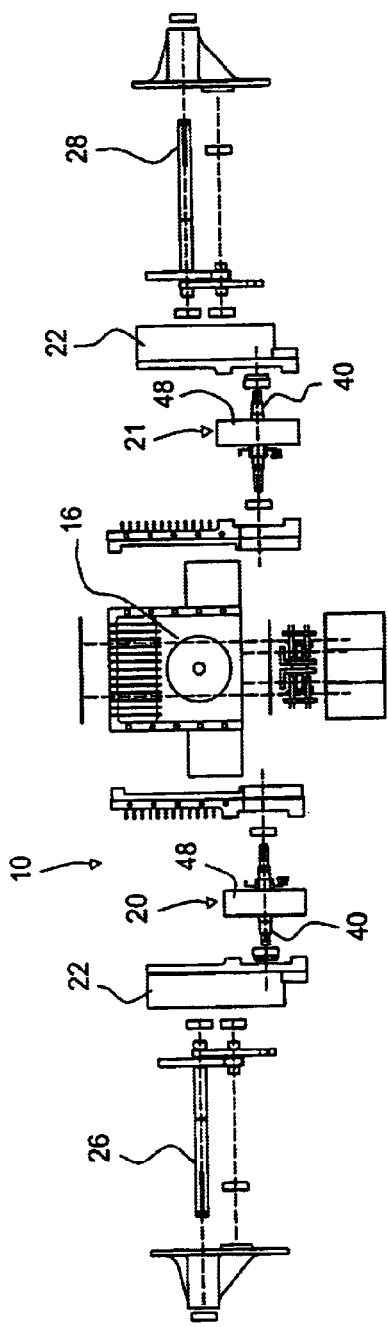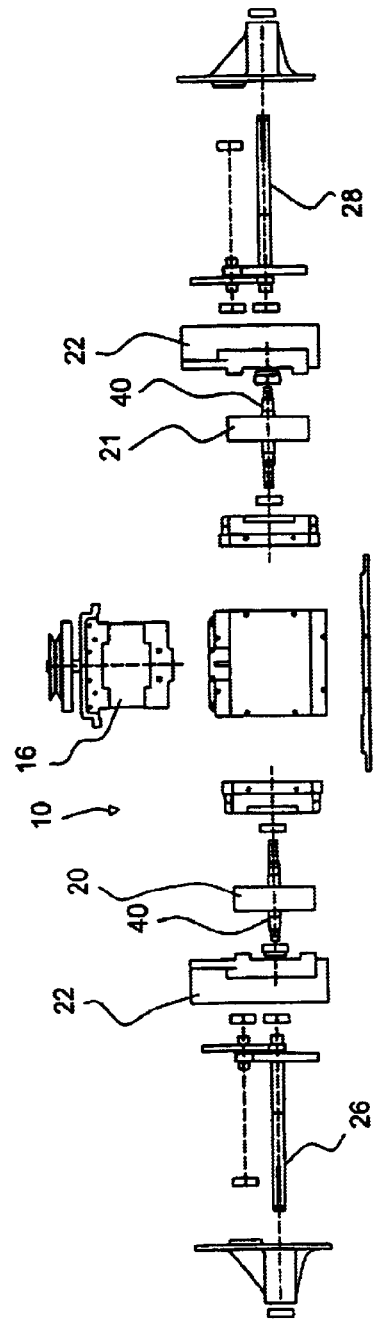

ELECTRIC GENERATOR AND MOTOR DRIVE SYSTEM

BACKGROUND OF THE INVENTION

This invention relates to the manner of generating, controlling, and distributing electrical power from an electrical generator driven by an internal combustion engine. The generated electrical power is used to power computer-controlled electric motors used as the traction drive in multipurpose lightweight vehicles and equipment such as mowers, and to provide power to on-board attachments and external electrical equipment.

Lightweight vehicles exist today in numerous configurations and are purposefully built to meet the application needs related to the industry in which they are used. Typical examples of these vehicles are: Ride on Lawn Mowers; Yard and Garden Tractors; Snow Blowers; Golf Carts and Utility Carts; Traffic/Parking Police Scooters; Postal Delivery Vehicles; Airport People Movers; Airport Tarmac Shuttle Vehicles; Disabled-Person Movers; Hybrid Electric Vehicles; Go-carts; and All-Terrain Vehicles. These vehicles require a power source that is typically directly or indirectly mechanically linked to the drive wheels for traction and some vehicles are provided with a mechanical connection for powering onboard attachments and externally attached devices. Drive power trains typically have used drive axles, chain/sprocket drives, manual gear-selection transmissions, hydrostatic transmissions, differential gears, etc. in varying combinations. Steering and speed control techniques vary between the different types of vehicles. Most of the vehicles use a mechanical differential in the drive train to balance the torque applied to the driven wheels so that the wheels can rotate at different speeds when they are required to make a turn The power sources for the listed vehicles have been either battery-powered electric motors or internal combustion motors. Both of these sources have shortcomings when they are used separately in a drive system.

Negative features of battery-powered motor driven vehicles have been the battery charge cycle, battery life, battery weight, space required for the batteries, and replacement costs of batteries. Many tasks cannot be completed without the batteries having to be recharged due to the length of operational time required or due to the batteries not being fully recharged. The charging time required can be excessive. The weight of the batteries adds to the load on the drive and a large space is required on the vehicle for mounting the batteries.

The internal combustion engine has features that detract from its use in directly driving a transmission and differential. Low output torque at low speed and decreasing torque beyond an optimum speed somewhere below maximum speed occurs in this engine. A typical engine will have a range of speeds up to 3300 RPM but torque efficiency will be maximized between 2500 and 2800 RPM. The loss of efficiency increases the thermal dissipation in the engine which causes fatiguing and failure of engine components. At low speeds, excessive vibration of the engine is also a problem. Continual operation of the internal combustion engine at its most efficient speed is desirable, but converting the fixed input speed from the engine to a variable speed output from the transmission is not efficient.

With the advent of solid-state power-switching devices such as MOSFETs (metal oxide semiconductor field effect transistors) and IGBTs (insulated-gate bipolar transistors) and microprocessors, the electronic controls for generators and motors that were very complex and expensive in the past, have become economically practical. Today, the electric generator/motor drive provides the flexibility in control and the ruggedness in assembly needed for a small electric motor-driven vehicle. Thus, an improved innovative small vehicle drive system has been developed with an electric generator driven by an internal combustion engine and an electric motor that provides high output torque up to its base speed. The generator supplies electrical power through a power control module to the motor/gearbox on each driven wheel and may provide external power through 110/120V AC and 12V outlets.

SUMMARY OF THE INVENTION

The present invention is directed towards a drive system, which integrates an electric generator; one or more electric motors and an electronic control module as a variable speed drive in either single, dual or four-wheeled traction drive configurations for a lightweight vehicle such as a mower. The generator is mechanically driven by the output shaft of an internal combustion engine to generate the electrical power for energizing the electric motors. A central computer in the electronic control module controls the output voltage of the generator and the speed and torque of each of the motors in the drive system. The speed input signal for the motors can be analog signals that come from sources such as a joystick, a potentiometer mounted on a steering wheel, control panel, foot pedal or remote location or digital signals from a digital device. Position/speed detectors on each motor and in some configurations the generator send signals back to the central computer for closed-loop control of the generator and of the motors. The generator supplies the DC voltage to the power control board for each motor as commanded by the central computer. The rotor of each motor is connected to a gearbox for speed reduction and increased torque that is applied to the wheel mounted on the output shaft of the gearbox. When the motors are not being driven, the generator may optionally supply DC power to the input of an electrical inverter that has an output to standard electric utility AC outlets that can be used to power auxiliary equipment.

This invention integrates 1) a high-efficiency switched reluctance (SR) electric generator driven by an internal combustion engine, 2) high-efficiency switched reluctance electric motors, 3) speed reduction gearboxes and 4) a power control module. The battery used for starting the internal combustion engine supplies power to the central computer and low voltage circuitry. The central computer in the power control module controls the generator output by controlling the electrical excitation to the generator from a solid-state generator power control board circuit in the power control module. The generator supplies power to each motor that directly drives a gearbox mounted to each driven wheel. In this drive configuration, the internal combustion engine can be run continually at the speed where it is most efficient.

The SR generator is driven by a pulley on its input shaft that is connected via a v-belt to a pulley on the output shaft of the internal combustion engine. The generator can also be driven directly by mechanically connecting it on the engine output shaft. The mechanical connection to the SR generator is driven by the motor at the speed that provides the highest efficiency in the engine. The electrical output of the generator is controlled by the central computer and a generator circuit in the power control module that supplies the excitation to the generator. The generator has an encoder, such as a Hall sensor or optical sensor, on the rotor that sends a position/speed signal to the power control module that must know the location of the rotor for control of commutation in the generator. The output is monitored by the power control module to determine the level of excitation required in order to maintain the correct output level. The output of the generator is electrically supplied to each of the motor power control boards in the power control module.

An inverter module can optionally be connected to the output of the generator to provide AC power for auxiliary equipment. The filtered DC input power from the generator is chopped by a semiconductor H-bridge. The switching in the H-bridge is controlled by the central computer board. The chopped AC output of the H-bridge passes through a low-pass filter to provide two synchronous 110/120 V AC, 50/60 Hz sinewave outputs that are 180 degrees out of phase. The outputs are combined to provide 120V AC and 240V AC outputs to standard AC outlets. As a safety feature, the inverter output may be inhibited when the vehicle is moving.

Switched reluctance motors are mounted through gearboxes to the driven wheels. The motor receives electrical control from the central computer and its individual motor circuit in the power control module. The motor also has an encoder, such as a Hall sensor or optical sensor, on the rotor that sends a position/speed signal to the central computer in the power control module where it is processed to determine the speed and position of the rotor. Sensorless systems are also well known in the prior art and may be used with this invention. The output shaft of the motor is mechanically directly connected to the input gear in the gearbox.

The preferred embodiment gearbox contains parallel shaft spur gears to provide a 30:1 speed reduction, although different gearing types and reductions may be used for different embodiments. The output shaft of the gearbox is the drive axle for its driven wheel on the vehicle. Torque is increased in the drive axle by the gear ratio in the gearbox.

The power control module contains the central computer, a generator circuit for the generator, and an individual motor circuit for each motor in the system. The central computer accepts speed control signals as varying DC voltage levels from a joystick or a potentiometer mounted on a foot pedal, control panel, steering wheel or a remote location. A digital input signal from a digital device such as another computer or an encoder can also be accepted by the computer for speed control. Pulses from a position/speed sensor on the rotor of the generator and each motor are fed back to the central computer board. For the generator, the position data is used by the central computer and generator circuit for control of the commutation of the phase excitation in the stator winding. For each motor, a similar action occurs with the motor circuit and the position data is also used by the motor circuit and central computer for commutation control in the phase outputs. In an outer (speed) control loop, the stream of pulses is used by the central computer to determine the speed of each motor and to compare the motor speed to the speed set point to determine if a speed correction signal is required to increase or decrease the power signal to that motor. In an inner "Torque" (current) control loop, a current signal for each motor is detected and sent back to the central computer where it is compared to a current set point to determine if the current should be increased or decreased to the motor whose current was detected. Each motor in the system is controlled by the appropriate motor circuit in this manner.

In this invention, the drive can operate in a forward direction or a reverse direction. The direction of each motor's rotation is controlled independently of the other motors in the system. The computer can command a reversal of direction for each wheel through a software generated command or a signal from a reverse/forward switch located on the steering wheel, a control panel, a joystick control, or a remote location. This mode of control allows several different functions to be performed.

The drive configuration with its control scheme in this invention performs the functions of a mechanical differential through a torque (current) control algorithm that is embedded in the software for the central computer. The torque (current) control algorithm balances the torque and changes the speeds of the driven wheels so that the vehicle can make a turn in the same manner that a mechanical differential would allow as defined by the formula:

Speed input to differential=Speed left wheel+Speed right wheel

The motors under most operational conditions will require power from the generator and power control board but when the vehicle is traveling down an incline or decelerating, the motors will regenerate energy back through the power control board and the generator into the source, an internal combustion engine, or other means, which will slow down the vehicle. This regenerative braking is desirable to slow down or stop the vehicle over a reasonable distance.

A two-motor drive is also described with a motor mounted on both the left side and the right side of the generator with a gearbox mounted to the face of each motor opposite the face mounted to the generator. The output shaft of each gearbox is the axle for the wheel on each side of the mower. A metal plate is mounted to the bottom of the assembly tying the two motors/gearboxes and the generator together to stiffen and make a robust assembly.

In this invention, the drive can be configured as an integral assembly as mentioned above or the generator and motor/gearbox wheel units can be mounted on the vehicle separately with electrical power harnesses and signal harnesses run separately between the components in the drive system over the vehicle chassis. A motor circuit controlled by the central computer is required for each motor. One, two, and four-wheel drive configurations can be built in this manner.

BRIEF DESCRIPTION OF THE DRAWINGS

FIG. 2A is a top exploded view of the mechanically combined generator/two-motor drive system that is powered by an internal combustion engine.

FIG. 2B is a side exploded view of the mechanically combined generator/two-motor drive system that is powered by an internal combustion engine.

DESCRIPTION OF THE PREFERRED EMBODIMENTS

Figure 1:
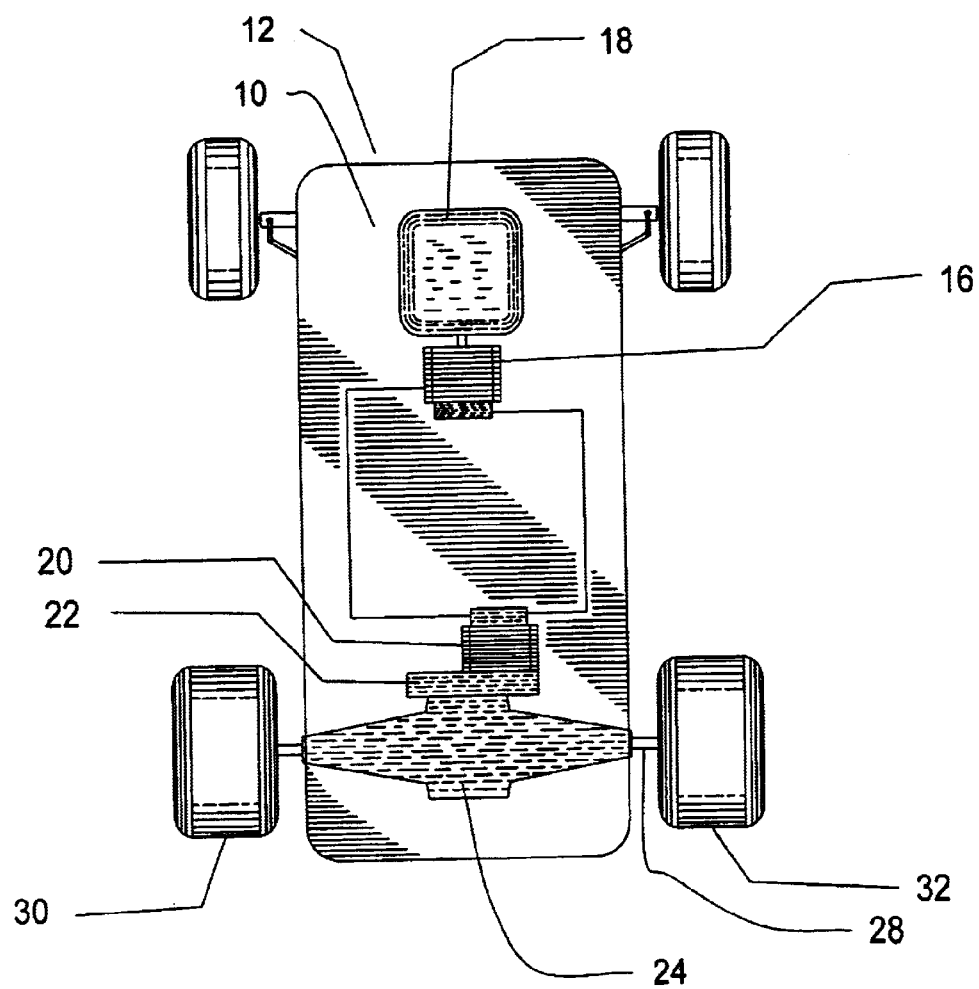
FIG. 1 is a schematic view of a four-wheel vehicle that has a generator driven by an internal combustion engine and a single motor driving a reducer/mechanical differential.

FIG. 1 shows a drive system 10 for a four-wheeled vehicle 12 with conventional steering 14. The drive system 10 includes an electric generator 16 which is driven by an internal combustion engine 18 and a motor 20 mounted to a gearbox 22 and standard mechanical differential 24 which drives the individual axles 26, 28 of the two rear wheels 30, 32. This configuration allows the engine 18 to operate continuously at its most efficient speed and eliminates the need for a transmission.

Advances in electric generators 16 and motors 22 have increased their efficiencies to the 80–90% range and improved their reliability. A comparison of different motors 22 and generators 16 was conducted to determine the best type for this drive system. The types considered were inverter-powered AC induction, brush-less dc and switched reluctance. Criteria for the selection were controllability, efficiency, reliability, input speeds, output torque at all speeds, size, construction, thermal management, noise, maintainability, ruggedness and cost. All types have excellent controllability with state of the art controllers, which are of similar complexity. Controllers for both AC induction motors and brush-less motors have power-switching devices that can be damaged by "shoot-through", high current that results from a short circuit across the power supply when both the high-side switch and the low side switch are on at the same time. "Shoot-through" cannot occur in switching devices of a switched reluctance controller because the phase windings of the motor are always between the switches. Switched reluctance motors produce maximum torque from zero speed to base speed without exceeding thermal limits due to all of the motor heat being dissipated in the stator which is the only part of the motor with coil windings. The lack of any windings on the rotor and the thermal transfer ability of the stator make possible a smaller size motor with simpler construction than the other two types. This simple construction reduces the maintenance costs for this type because only the rotor bearings will require servicing or replacement. The switched reluctance motor is less expensive than brush-less dc motors, which require rare earth magnets on the rotor. Due to the absence of magnets in the switched reluctance motor, demagnetization of magnets is not a concern as it is in brush-less motors and some other types. The torque ripple in the switched reluctance motor may make it noisier than both of the other two types but in an outdoor application the noise is not objectionable. The switched reluctance generator does not require a fixed speed as is required by an AC induction generator. The switched reluctance motors and generators were selected to be in this drive system because of their ruggedness due to their simple construction, lower mass for the same horsepower, torque/speed characteristics, good thermal transfer and cost of manufacturing. Other motor types may be used with appropriate changes in the operating and control systems.

The gearbox 22 selected to be mounted on the motor output shaft is a parallel shaft spur gearbox for a 30:1 reduction ratio. Due to tooth deflection as the teeth of the gears mesh, spur gears are noisier than some other types such as planetary gears but in this application the noise is not objectionable. The cost of the selected gearbox 22 is considerably less costly than other types and is widely used in many applications.

FIGS. 2A and 2B show exploded views of an alternative embodiment of a drive system 10 that is composed of an electric generator 16 mounted between two electric motors 20, 21 with a gearbox 22 mounted on the output side of each motor 20, 21. Each gearbox output shaft forms the drive axle 26, 28 for a wheel 30, 32 (not shown, see FIG. 3). Although the generator 16 and motors 20, 21 are physically mounted together, their shafts are not connected. The input drive to the generator 16 comes from the output shaft 34 (not shown, see FIG. 3) of an internal combustion engine 18 via a v-belt drive 36 (not shown, see FIG. 3). The output of the generator 16 supplies the electrical power to the motors 20, 21 through the motor circuit 38 (not shown, see FIG. 7) for each motor 20, 21. The rotor 40 of each motor 20 is the drive shaft for the gearbox 22 mounted on the output side of each motor 20, 21.

Figure 3:
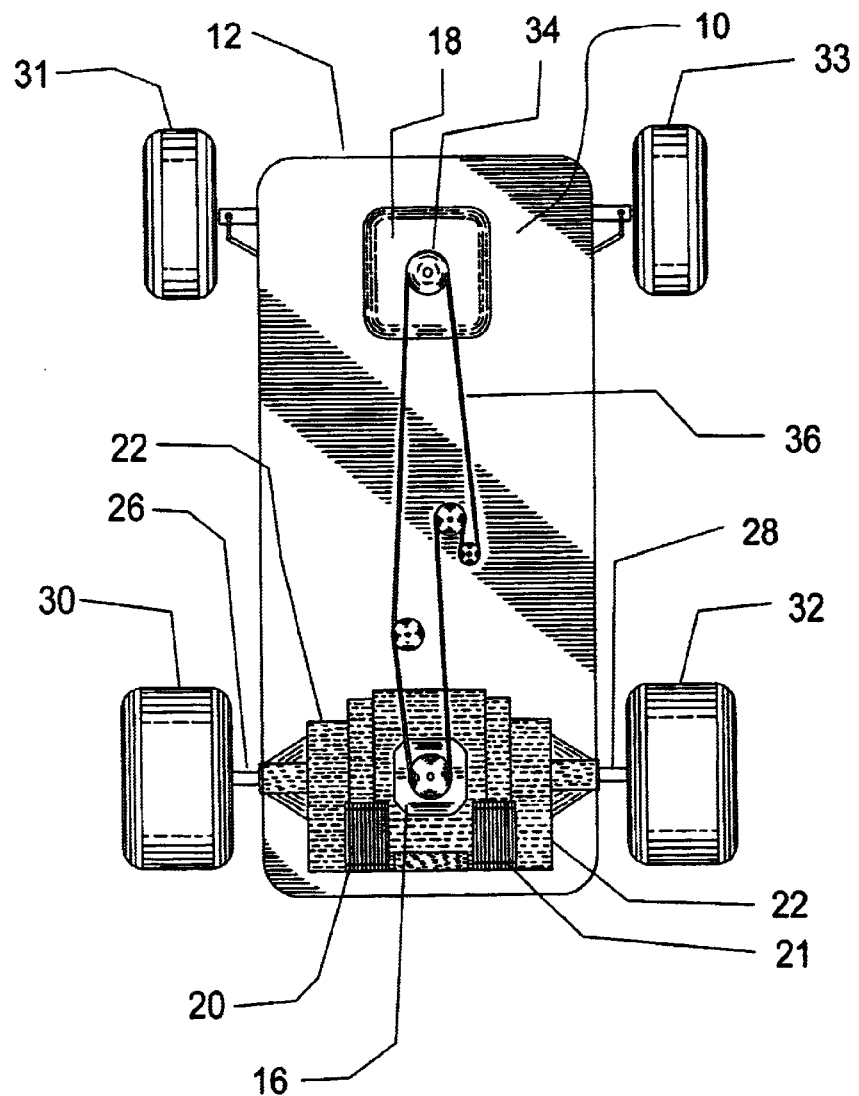
FIG. 3 is a schematic view of a yard tractor with rear wheel drive that embodies the invention as it is configured in FIG. 2A and 2B with the front wheels non-driven and used for steering.

The vehicle 12 in FIG. 3 includes the drive system 10 of FIGS. 2A and 2B to drive the two rear wheels 30, 32. The two non-driven wheels 31, 33 are used for steering. The internal combustion engine 18 can be operated continually at its torque-efficient speed because the speed of the vehicle 12 will be independently electronically controlled through the generator 16, power control module and the motors 20, 21 driving the two rear wheels 30, 32. The speed is controlled by either an analog or digital signal from a device operated by the vehicle operator. The device can be an analog potentiometer mounted on a foot pedal, a control panel, steering wheel or other convenient location. A rotary digital encoder 46, sometimes referred to as a digital potentiometer, can be mounted in one of the same locations and supply a digital signal to the speed control input of the central computer 44 in the power control module. The speed does not change suddenly but is ramped up to the speed set by the operator. The speed changes for each of the driven wheels 30, 32 when the vehicle 12 makes a turn, or when one of the driven wheels 30, 32 loses traction, are made by the torque (current) control algorithm embedded in the central computer 44. The vehicle 12 can be driven in reverse after the operator has selected the reverse direction with a forward/reverse switch.

The motors 20, 21 in the drive system 10 for the vehicle 12 in FIG. 3 will regenerate electrical energy when the vehicle 12 attempts to go faster than the set speed down an inclined surface. The regenerated energy will flow from the motors 20, 21 back through their respective motor circuits 38 and the generator 16 to the internal combustion engine 18 which will slow down. Optionally, the regenerated energy can be stored in the vehicle battery (not shown) or dissipated in resistors for braking As shown, the 110/120V AC and 12V DC outlets are optional for this configuration. Mechanical brakes, as well known in the prior art, may be used on any of these embodiments to provide for additional braking capabilities.

Figure 4:
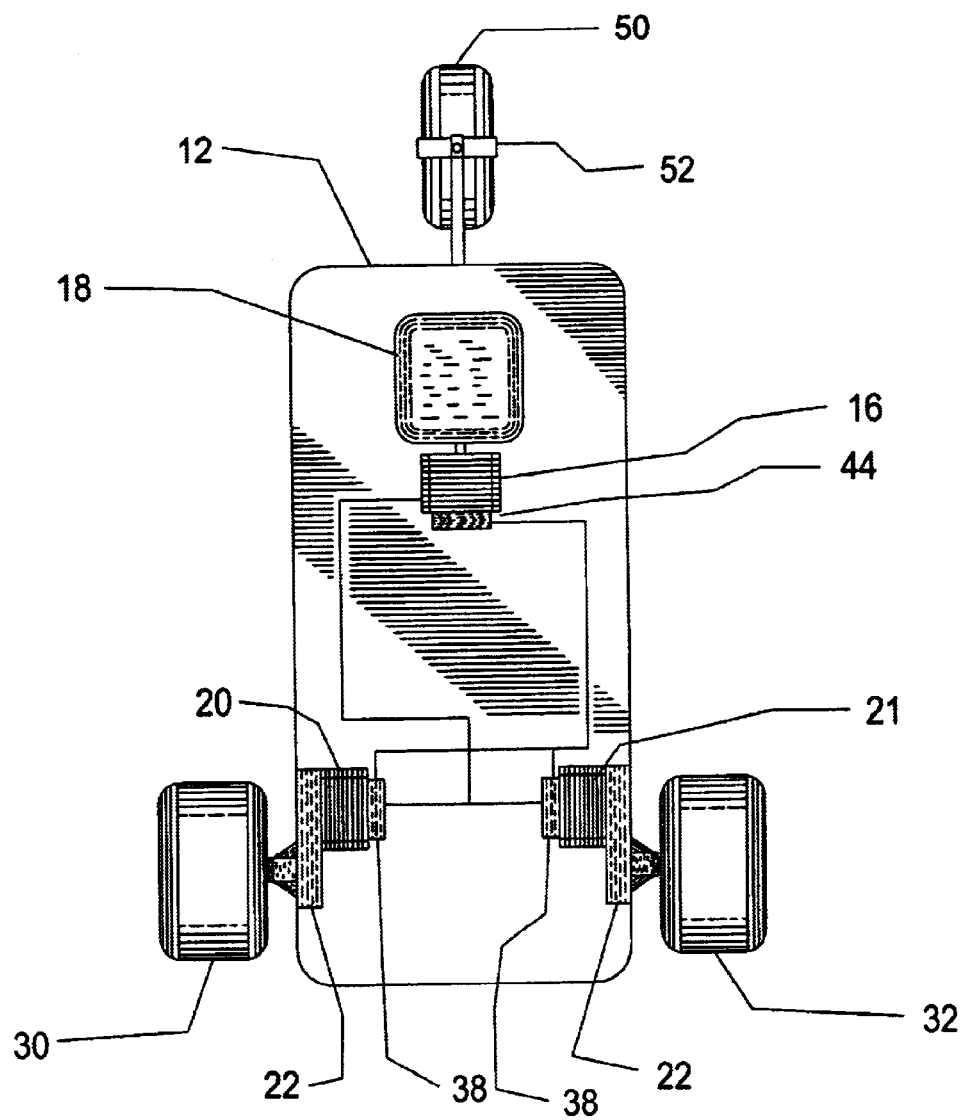
FIG. 4 is a schematic view of a three-wheel vehicle that embodies the invention in the drive system configured to drive two wheels with the third wheel mounted in a swiveling stirrup attached mechanically to the frame of the vehicle as a caster.

In FIG. 4, the three-wheel vehicle 12 uses the drive system 10 to drive the two driven wheels 30, 32 independently. The third wheel 50 located on the opposite end of the vehicle 12 is mounted as a caster in a swiveling stirrup 52 attached to the vehicle 12 frame. The speed and steering are controlled through the two motors 20, 21. The two driven wheels 30, 32 can be on either the front or back of the vehicle 12.

The motors 20, 21 on the two wheels 30, 32 are controlled through the computer and appropriate motor circuit 38 for independent control of the speed, steering and direction. The central computer 44 will receive a speed input from a control 45, such as a joystick, an analog potentiometer or digital encoder mounted on a foot pedal or other location. If a joystick is used, it can also send the steering, speed, and directional input signals to the central computer 44. The use of a speed-control foot pedal requires separate control devices for steering and direction. A rotary digital encoder with quadrature output can provide a steering and speed signal and a forward/reverse switch can provide a directional signal to the central computer 44. To control the speeds and directions of the wheels 30, 32, the central computer 44 sends command signals separately to a microprocessor-based motor controller circuit 38 for each motor 20, 21. The motor controller circuit 38 on each wheel 30, 32 controls its respective circuit output to its motor 20, 21 independently of the controller 38 for the other motor 20, 21. The wheels 30, 32, in making a turn, can travel at different speeds required to make the turn. One wheel 30, 32 can be driven in reverse as the other wheel 30, 32 is driven forward to make a zero radius turn when the forward speed is zero. The third wheel 50 in the stirrup 52 will swivel to allow the vehicle 12 to move in the direction determined by the speeds and direction of the driven wheels 30, 32. The differential steering control through a torque (current) control algorithm is not used in this vehicle 12.

The generator 16 is driven by the internal combustion engine 18 and controlled by the power control module in the central computer 44. The central computer 44 controls the output of the generator 16 through the electrical excitation from the generator circuit 42 for the generator 16.

Figure 5:
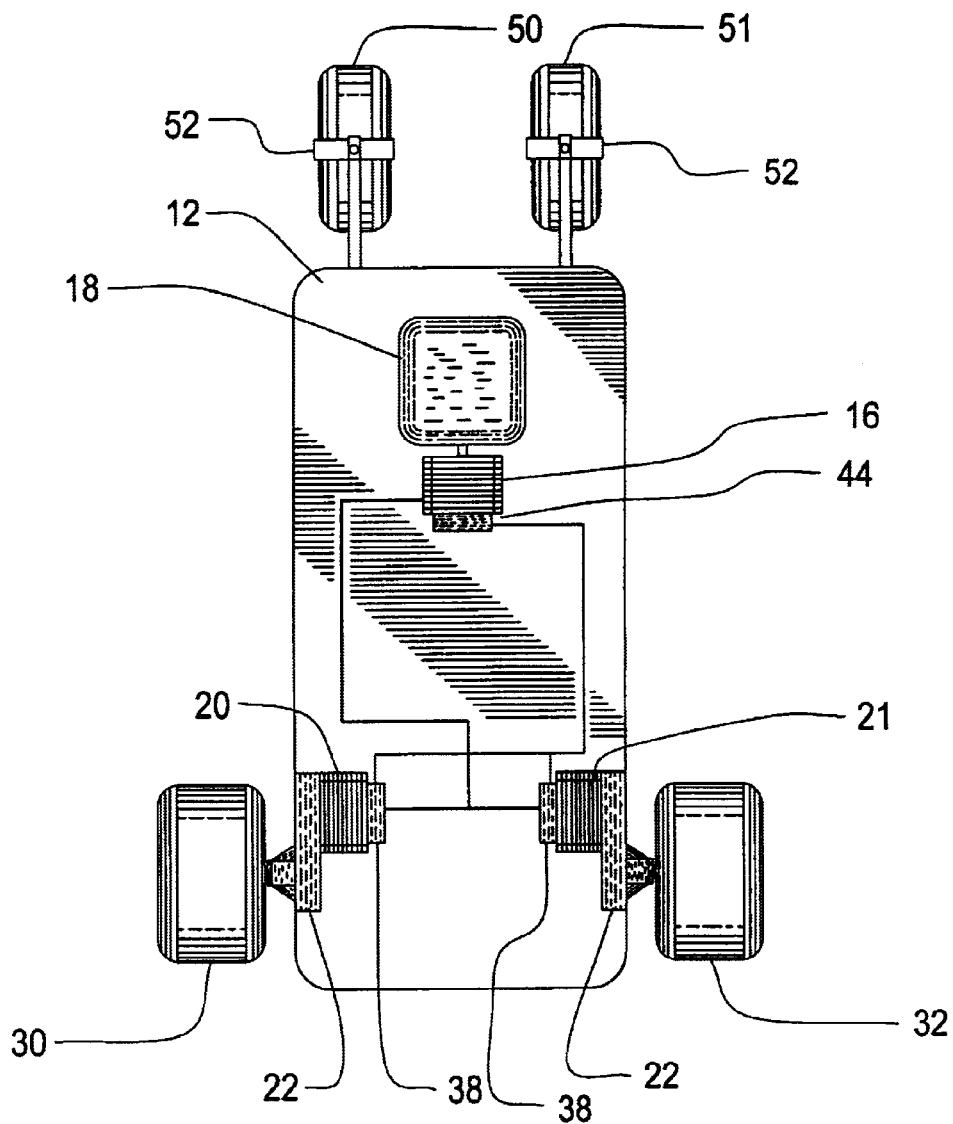
FIG. 5 is a schematic view of a four-wheel vehicle that embodies the invention with a motor/gearbox on each of two wheels and two non-driven wheels mounted in swiveling stirrups attached mechanically to the vehicle frame as casters.

The vehicle 12 in FIG. 5 is a four-wheel vehicle 12 similar to the vehicle 12 in FIG. 4. The only difference is the second non-driven wheel 51. The drive system 10 is configured and functions the same way as the three-wheel drive of FIG. 4. Both non-driven wheels 50, 51 swivel in their stirrups 52 to allow the vehicle 12 to move in the direction determined by the speed and direction of the driven wheels 30, 32.

Figure 6:
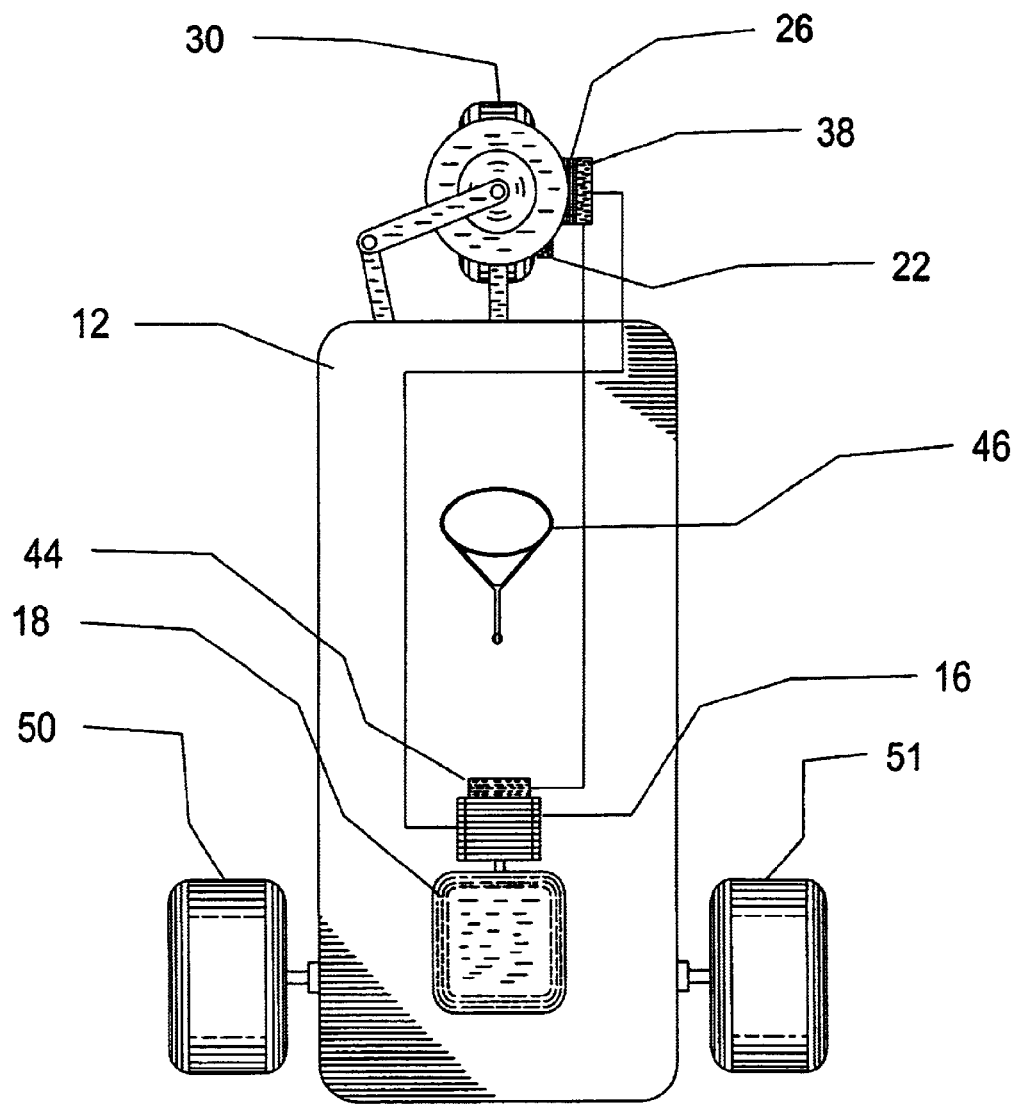
FIG. 6 is a schematic view of a three-wheel vehicle that embodies the invention with a motor/gearbox mounted on the wheel that is mechanically linked to the operator's steering wheel.

In FIG. 6, a three-wheel vehicle 12 has only one driven wheel 30. This embodiment of the invention has the internal combustion engine 18 driving the generator 16 as previously described. The motor 20 and gearbox 22 are mounted on the one swiveling wheel 30 that is used for steering the vehicle 12. The other two wheels 50, 51 are non-driven and follow at the speed and in the direction determined by the driven wheel 30. The speed control signal to the central computer 44 can be supplied by one of the controls 45, including an analog potentiometer or digital encoder mounted on a foot pedal or on another location that is actuated by the vehicle 12 operator. Steering is accomplished by the steering wheel 46 that is mechanically to linked to the driven wheel 30.

Figure 7:
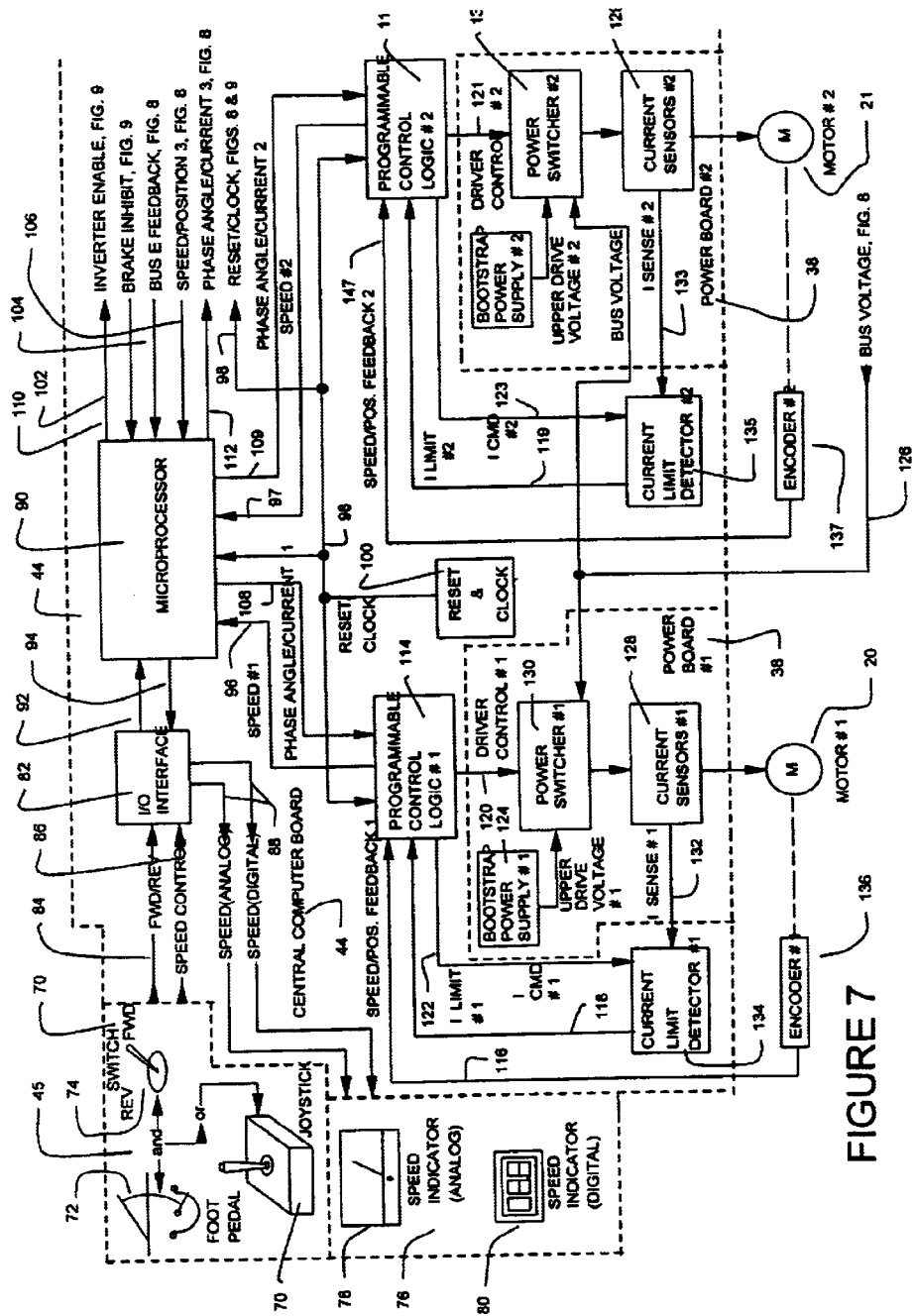
FIG. 7 is a schematic view of the central computer and motor control circuits.
Figure 8:
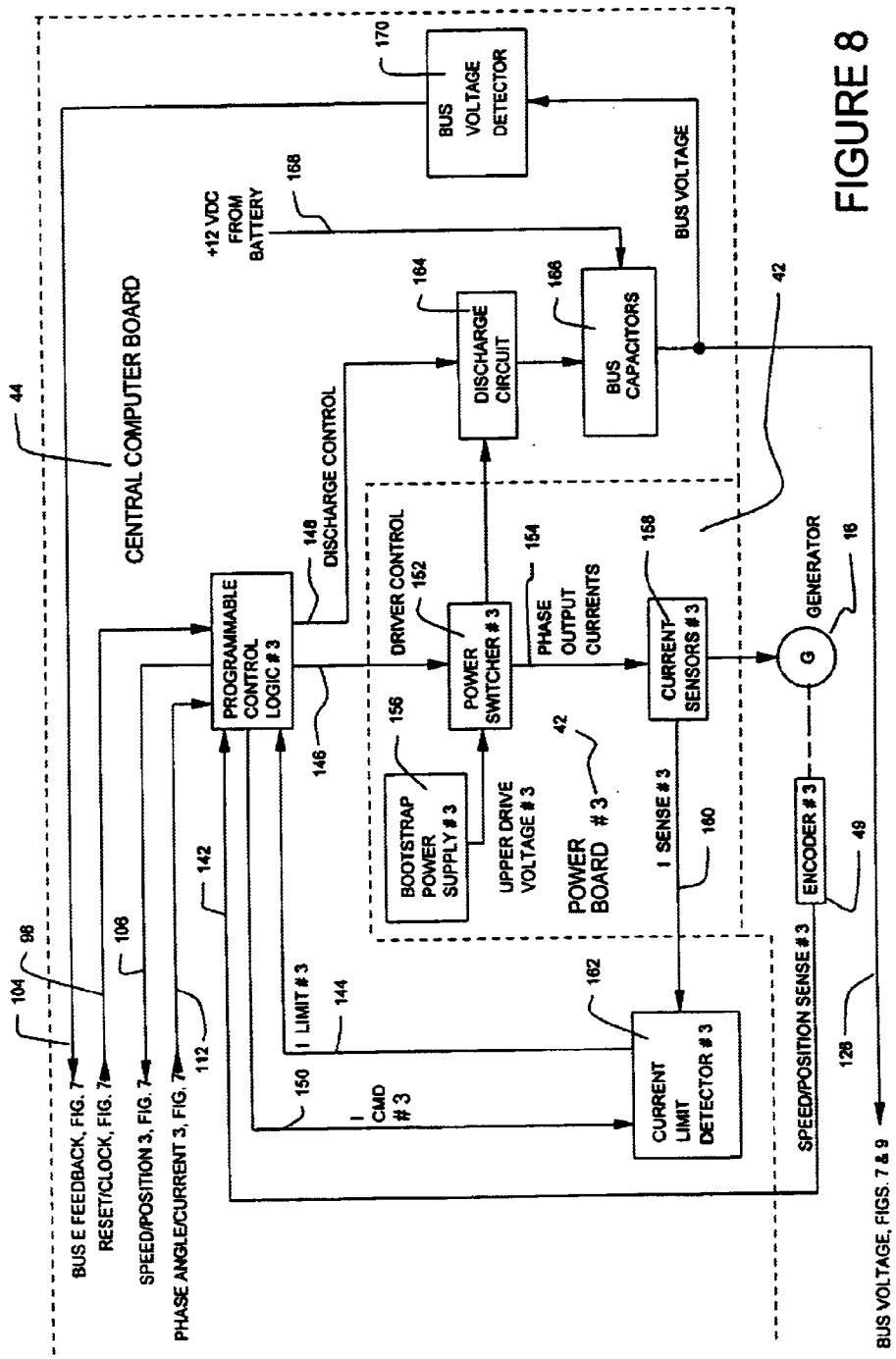
FIG. 8 is a schematic view of the central computer and the generator control circuit.
Figure 9:
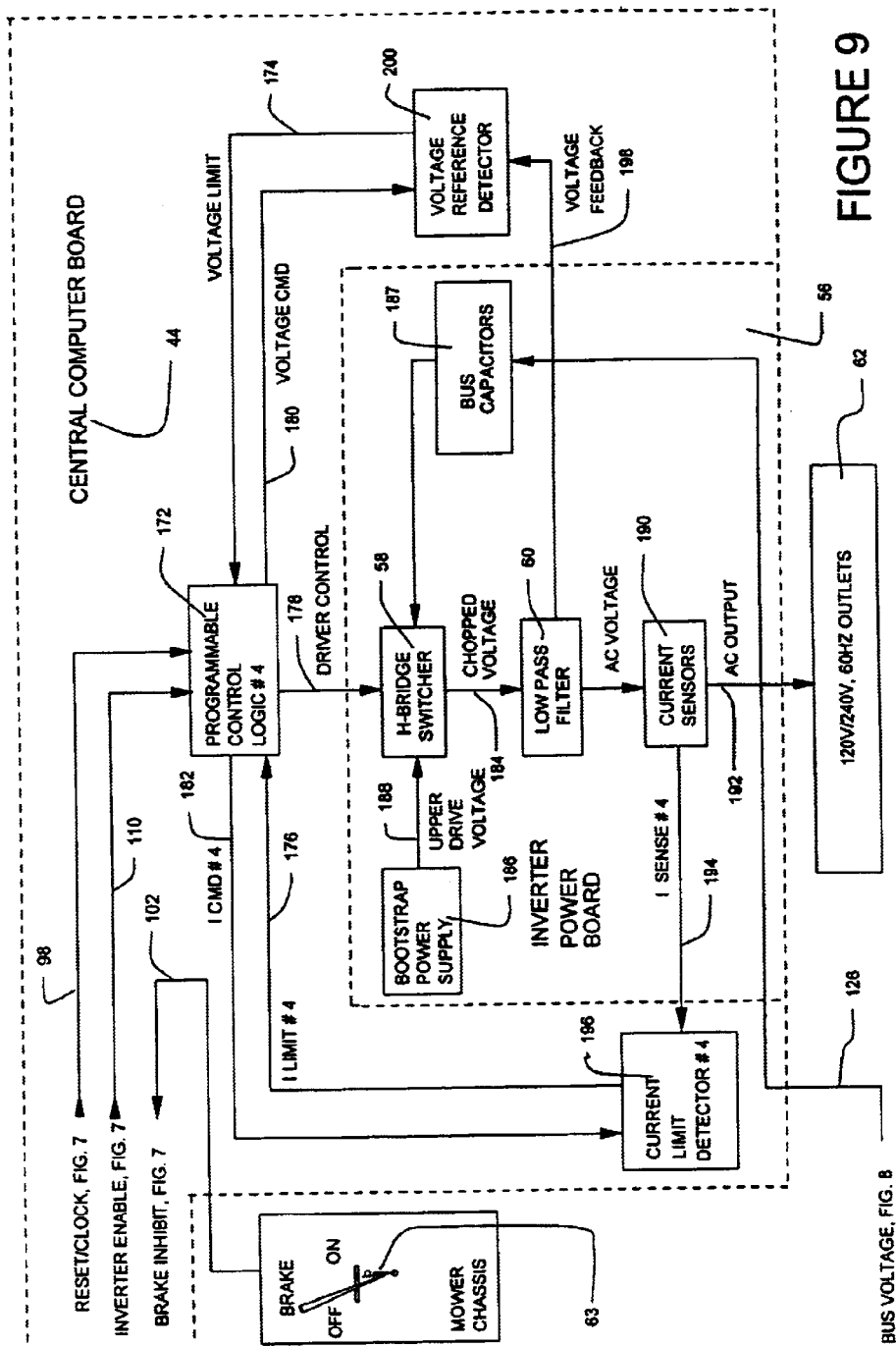
FIG. 9 is a schematic view of the central computer and inverter circuit.

FIGS. 7 through 9 show the schematic representation of the circuitry for the central computer's 44 connections for analyzing signals and running the basic operation of the motor circuits 38, the generator circuit 42, and the inverter circuit 56. The central computer receives input from the controls 45, represented as a joystick 70, a foot pedal 72, and a forward/reverse switch 74. Generally, the controls provide both forward reverse control 84 and speed control 86 which are fed into an input output interface 82. The input output interface 82 communicates information from the controls 45 to the microprocessor 90 through a control interface signal 92. The Microprocessor may return information to the input output interface 82 through an interface feedback signal 94 which may be used by the input output interface 82 to generate control feedback signals 88. The control feedback signals 88 may provide feedback to the operator by feedback gauges 76 such as an analog speed indicator 78 or a digital speed indicator 80.

The microprocessor 90 utilizes the control interface signal 92 along with motor speed signals 96 and 97, clock signal 98, brake inhibit signal 102, bus energy feedback 104, and generator speed/position signal 106 to generate the interface feedback signal 94, motor phase angle/current signals 108 and 109, inverter enable signal 110, and the generator phase angle/current signal 112.

Because the operation of each motor 20, 21 is similar once the individual phase angle/current signal 108 and 109 is received, only one motor operation will be described. The motor phase angle/current signal 108, 109 is used by the motor programmable logic control 114, 115 along with the clock signal 98, motor speed/position feedback signal 116, 117, and motor current limit signal 118, 119 to generate the motor driver control signal 120, 121 and motor current command signal 122, 123. The motor driver control signal 120, 121 is used by the motor power switcher 130, 131 to control the power flow from either a motor bootstrap power supply 124, 125 or the bus voltage 126 through the motor current sensor 128, 129 and into the motor 20, 21. A current sensor signal 132, 133 is sent to the current limit detector 134, 135 from the current sensor 128, 129. The motor 20, 21 is connected to the motor encoder 136, 137 to provide the motor speed/position feedback signal 116, 117 to the motor programmable logic control 114, 115.

FIG. 7 shows the schematic representation of the circuitry for each motor 20, 21 and the connections for electrically powering the motor 20, 21 by the output of a motor circuit 38 connected to the central computer 44. The motor circuit 38 utilizes solid-state power switching devices controlling the electrical drive level for the motor 20, 21. The acceleration of the motor 20, 21 is controlled by ramping up a speed set-point signal that that is a reference for speed regulation. An encoder 47, either Hall sensors or optical sensors, on the motor 20, 21 output shaft sends back a stream of pulses that is processed by the central computer 44 to determine the motor 20, 21 speed and the rotational position of the rotor 40. The speed signal is algebraically summed with a speed set-point signal with the resultant error signal digitally processed by the central computer 44 which sends a change in the control signal to the motor circuit 38 to increase or decrease the power to the motor 20, 21 until the speed is equal to the speed set-point. The rotational position is used by the central computer 44 to synchronize the switching of the dc voltage to the phase windings on the stator 48 to the angle of rotation of the rotor 40. The synchronization is necessary for the operation of the SR motor 20, 21.

The drive system 10 is capable of different modes of control as programmed in the central computer 44 because each motor 20, 21 is individually controlled. One mode that is implemented in this invention is the electronically simulated function of a mechanical differential.

The drive configuration with its control scheme in this invention performs the functions of a mechanical differential through a torque (current) control algorithm that is embedded in the software for the central computer. The torque (current) control algorithm balances the torque and changes the speeds of the driven wheels so that the vehicle can make a turn in the same manner that a mechanical differential would allow as defined by the formula:

Speed input to differential=Speed left wheel+Speed right wheel

The mechanical differential can be simulated by implementation of a torque (current) control algorithm. The following algorithm is used:

STEP Action

1. Measure the current (torque) into the left motor 20.
2. Measure the current (torque) into the right motor 21.
3. Compare the currents into each of the motors 20, 21. If the currents are equal, go to step #7.
4. If the current in the left motor 20 is lower than the current in the right motor 21, decrement the current to the right motor 21.
5. If the current in the right motor 21 is lower than the current in the left motor 20, decrement the current to the left motor 20.
6. If the current in the left motor 20 is lower than the current in the right motor 21, equally increment the speed of the left motor 20 and decrement the speed of the right motor 21.
7. If the current in the left motor 20 is higher than the current in the right motor 21, equally decrement the speed of the left motor 20 and increment the speed of the right motor 21.
8. (If the currents are unequal?) Go back to step #1.
9. Measure the speed of the left motor 20.
10. Measure the speed of the right motor 21.
11. Average the speeds of the two motor 20, 21 and compare the average speed to the speed set point. If the average speed is equal to the set point, go to step #12. Otherwise, go back to step #1.
12. Measure the current into the fastest motor 20, 21.
13. Measure the current into the slowest motor 20, 21.
14. If the currents into the motors 20, 21 are equal, go to step #17.
15. If the current into the fastest motor 20, 21 is lower than the current into the slowest motor 20, 21, go back to step #4.
16. If the current into the fastest motor 20, 21 is higher than the current into the slowest motor 20, 21, equally decrement the speed to the fastest and increment the speed to the slowest motor 20, 21. Increment the current to the slowest motor 20, 21. Go back to step #9.
17. Next step in the control program.

A wheel that loses traction will cause its driving motor 20, 21 to need less torque and consequently will draw less current from the motor circuit 38. When the drop in current to the motor 20, 21 is detected, the central computer 44 starts the torque control algorithm to reduce the current to both motors 20, 21 to lower the torque until both motors 20, 21 have the same torque and the speed of the motor 20, 21 that lost traction is increased and the speed of the other motor 20, 21 is decreased so that the average of the speeds of the two motors 20, 21 always equals the set speed. The software in the central computer 44 will always attempt to keep the torque of each motor 20, 21 equal to the torque of the other motor 20, 21 by keeping the currents equal. Also, the central computer 44 will control the speeds of the two motors 20, 21 so that the average of the speeds always equals the set speed. When the vehicle 12 is making a turn, the wheel on the outside of the turn will increase in speed and the inside wheel will decrease in speed so that the average speed is equal to the set speed with the torque to each wheel being equal.

An optional method of controlling the acceleration and deceleration of the vehicle can be implemented with acceleration/deceleration curve data in a table stored in the central computer. The acceleration of the vehicle will follow the curve programmed into the table to the set speed in a predetermined amount of time. Any change in running speed, increase or decrease, will be controlled by the values in the table. Different rates of change can exist for acceleration and deceleration in the forward direction. The acceleration and deceleration in the reverse direction can also have different rates of change.

The speed of the vehicle can be reduced as it is being steered into a curve so that the vehicle does not tip over. The speed is coordinated with a steering signal from an encoder on the steering wheel or other steering device. All movements of the vehicle can be made in a safe manner either by limiting the speed of the outer wheel or by the speed being coordinated with the steering signal.

Other speed control modules may be added to improve the safe operation of the vehicle under different conditions. These conditions include the traveling of the vehicle at an acute angle to the horizon.

Optionally, other speed and torque controls may be implemented, such as controlled acceleration and deceleration to match predetermined curves, positive traction, and limited slip differential.

The optional method of controlling the acceleration and deceleration of the vehicle can be implemented with a control table stored in the on-board memory of the microprocessor in the central computer. The acceleration of the vehicle will follow the curve programmed into the table to the set speed in a predetermined amount of time. The maximum time will occur when the vehicle is going from a standstill to maximum speed. Any change in running speed, increase or decrease, will be controlled by the values in the table. Different rates of change can exist for acceleration and deceleration in the forward direction. The acceleration and deceleration in the reverse direction can also have different rates of change.

This control method can be used to reduce the speed of the vehicle when it is being steered into a curve so that the vehicle does not tip over as it travels through a sharp turning radius. All movements of the vehicle can be made in a safe manner either by limiting the speed of the outer wheel or by coordinating the speed with a steering signal from an encoder on the steering wheel or other device.

Other speed control modules may be added to improve the safe operation of the vehicle under different operating conditions, e.g., the traveling of the vehicle at an acute angle to the horizon.

Positive traction can be implemented by simulating a locked differential by keeping the speed of the two wheels equal at all times regardless of the loss of traction by either wheel. This mode can be selected by a switch, located on a control panel or other location on the vehicle 12, that inputs a signal to the central computer 44 to bypass the torque control algorithm. Also, it can be limited to low speeds by detection of speeds lower than a given speed set-point and then bypassing the torque control algorithm until the speed is increased above the set-point. The locked differential can only be used on wheels that are not involved in the steering of the vehicle 12.

A second type of implementation called limited-slip differential can be made by allowing a set percentage of difference in torque (current) to occur in step #3 of the torque control algorithm. The central computer 44 can vary the percentage of slip allowed at different speeds by changing the percentage of difference in torque (current) allowed in step #3 of the torque (current) control algorithm as the speed is changed.

Further modules for the computer may be desirable to control acceleration limits, deceleration limits, turning speed and other operational factors to provide for a margin of safety during operation of the units. These aspects are well known in the prior art and may be implemented in this control scheme.

As shown in FIG. 8, the generator phase angle/current signal 112 is used by the generator programmable logic control 140 along with the clock signal 98, generator speed/position feedback signal 142, and generator current limit signal 144 to generate the generator speed/position signal 106, generator driver control signal 146, generator discharge control signal, 148 and generator current command signal 150. The generator driver control signal 146 is used by the generator power switcher 152 to control the phase output currents 154 from a generator bootstrap power supply 156 through the generator current sensor 158 and into the generator 16 to generate the bus voltage 126. A current sensor signal 160 is sent to the current limit detector 162 from the current sensor 158. The generator 16 is connected to the generator encoder 49 to provide the generator speed/position feedback signal 142 to the generator programmable logic control 140.

The generator programmable logic control 140 generates the discharge control signal 148 for the discharge circuit 164 which discharges power from the generator power switcher 152 into the bus capacitors 166. The bus capacitors 166 are also connected to the battery 168. The bus capacitors 166 supply the bus voltage 126 which is monitored by the bus voltage detector 170 for generating the bus energy feedback signal 104 used by the microprocessor 90.

FIG. 8 shows a schematic representation of how the generator 16 output is regulated through its electrical excitation that comes from the generator circuit 42, which is electronically controlled by the central computer 44. A generator output sense signal from the generator encoder 46 is algebraically summed with an output set-point signal with the resultant error signal digitally processed by the central computer 44 which sends a change in the control signal to the generator circuit 42 if necessary to increase or decrease the excitation to the generator 16 to correct the generator output level. A generator encoder 46 on the generator rotor sends a stream of pulses back to the central computer 44 where it is processed to determine rotational position of the generator rotor. The rotational position is used by the central computer 44 to synchronize the switching of the DC excitation to the phase windings on the generator stator to the angle of rotation of the generator rotor. The synchronization is necessary for the operation of the switched reluctance generator 16. The output of the generator 16 provides the electrical power to a motor circuit 38 for each motor 20, 21 in the drive system 10.

As shown in FIG. 9, the brake inhibit signal 102 is generated by a brake switch 63 located on the motor chassis. The brake inhibit signal 102 is used by the microprocessor to control the inverter enable signal 110 which is input into the inverter programmable logic control 172. The inverter programmable logic control 172 uses the inverter enable signal 110, the reset clock signal 98, voltage limit signal 174, and inverter current limit signal 176 to generate the inverter driver control signal 178, inverter voltage command signal, 180 and inverter current command signal 182. The inverter driver control signal 178 is used by the H-bridge power switcher 58 to control the chopped inverter voltage 184 from the upper drive voltage 188 from an inverter bootstrap power supply 186 and the inverter bus capacitors 187 through the low pass filter 60 and into the inverter current sensors 190 to generate the AC Output 192 for the outlets 62. A current sensor signal 194 is sent to the inverter current limit detector 196 from the inverter current sensor 190. The current sensor signal 194 is used by the inverter current limit detector 196 to generate the inverter current limit signal 176. The inverter bus capacitors 187 are connected to the bus voltage 126. The low pass filter 60 is also connected to provide an inverter voltage feedback signal 198 to the voltage reference detector 200. The voltage reference detector 200 uses the inverter voltage feedback signal 198 and the voltage command signal 180 to generate the voltage limit signal 174.

The schematic representation shown in FIG. 9 provides an overview of the implementation of the option for converting the output of the generator 16 to commercial AC voltages for powering auxiliary equipment, e.g., weed-eaters and chain-saws. The filtered DC output of the generator 16 is applied to the input inverter circuit 56 where it is chopped by a semiconductor H-bridge 58. The switching in the H-bridge 58 is controlled by the central computer 44 board. The synchronized switching signals from the central computer 44 drive the control inputs of the H-bridge 58. The chopped voltage output is passed through a low-pass filter 60 to provide two synchronous 120 VAC, 60 Hz sine wave outputs that are 180 degrees out of phase. Standard AC outlets 62 are connected to these two outputs in combinations to provide 120V AC and 240V AC for external use from the vehicle 12. As a safety feature, the inverter outputs 62 are inhibited by a signal from the switch 63 on the vehicle 12 brake so that the outputs are not available when the brake is off and the vehicle 12 is moving.

The scope of this invention is defined by the accompanying claims and not necessarily by specific features of the exemplary embodiments that have been described. Thus, although there have been described particular embodiments of the present invention of a new and useful Electric Generator and Motor Drive System, it is not intended that such references be construed as limitations upon the scope of this invention except as set forth in the following claims.

What is claimed is:

1. A drive system for a vehicle, comprising:
   a first wheel for propelling the vehicle;
   a first motor mechanically connected to the first wheel such that the first motor drives the rotation of the wheel, the first motor including a first motor rotor and a first motor encoder placed to monitor the first motor rotor, wherein the first motor is a high-efficiency switched reluctance electric motor or a brush-less DC motor;
   a generator electrically connected to the first motor such that the generator converts mechanical power into electrical power and supplies this electrical power to the first motor;
   an internal combustion engine mechanically connected to the generator such that the internal combustion engine supplies mechanical power to the generator; and
   a power control module electrically connected to the generator and the first motor, the power control module including a central computer and a control circuit, wherein the central computer is adapted to control the speed and direction of the first motor through the control circuit, and to control the generator output level to the first motor based on the first motor power requirements, and further wherein the power control module monitors a motor signal sent to the power control module from the motor encoder to determine the level of excitation required in order to control the speed and direction of the first motor.

2. The drive system of claim 1, further comprising:

a second motor mechanically connected to a second wheel and electrically connected to the generator such that the second motor drives the rotation of the second wheel, the second motor including a second motor rotor and a second motor encoder placed to monitor the second motor rotor, wherein the second motor is a high-efficiency switched reluctance electric motor or a brush-less DC motor.

3. The drive system of claim 1, wherein the internal combustion engine is run continually at the speed where it operates at maximum torque.

4. The drive system of claim 1, wherein during braking of the first wheel the first motor will regenerate energy back through the first motor to apply a braking force against the internal combustion engine.

5. The drive system of claim 1, wherein the central computer is adapted to control the generator output by controlling electrical excitation of the generator through the control circuit.

6. The drive system of claim 5, further comprising:

a speed set point signal representing a desired generator speed;

a generator speed signal representing the actual speed of the generator;

a resultant generator error signal representing the difference between the speed set point signal and the generator speed signal; and a generator control signal;

wherein the central computer is adapted to subtract the generator speed signal from the speed set point signal to form the resultant generator error signal; and wherein the central computer is further adapted to process the resultant generator error signal to create the generator control signal which is sent to the control circuit to control electrical excitation of the generator and the speed of the generator and internal combustion engine.

7. The drive system of claim 1, further comprising:

a speed set point signal;

a motor speed signal;

a resultant motor error signal; and a motor control signal;

wherein the central computer is adapted to subtract the motor speed signal from the speed set point signal to form the resultant motor error signal; and wherein the central computer is further adapted to process the resultant motor error signal to create the motor control signal which is sent to the motor circuit to control the speed of the first motor.

8. The drive system of claim 1, further comprising:

a speed set point signal, wherein the central computer is adapted to determine and compare the speed of the motor to the speed set point signal to determine if a speed correction is required to increase or decrease the power output level to that motor.

9. The drive system of claim 8, wherein the central computer is adapted to control acceleration of the motor through increases in the speed set point signal.

10. The drive system of claim 1, further comprising:

a current set point signal, wherein the central computer is adapted to determine and compare the current to the motor to the current set point signal to determine if a current correction is required to increase or decrease the power signal to the motor.

11. The drive system of claim 1, further comprising:

an inverter module connected to the generator to provide external auxiliary power output.

12. The drive system of claim 11, the inverter module including:

a semiconductor H-bridge for chopping the output of the generator; and a low-pass filter for filtering the chopped generator output to provide an alternating current signal.

13. The drive system of claim 12, wherein the alternating current signal includes two components characterized as synchronous 110/120 VAC, 50/60 Hz sinewave inverter outputs that are 180 degrees out of phase.

14. The drive system of claim 13, wherein the outputs are combined to provide a 240V AC output.

15. The drive system of claim 11, wherein the external auxiliary power output from the inverter is not provided when the mower is moving.

16. The drive system of claim 2, wherein the central computer is further adapted to control the speed and direction of the second motor through the control circuit, and to control the generator output level to the second motor based on the second motor power requirements.

17. The drive system of claim 16, the power control module further including a first operator input device and a second operator input device, the first operator input device generating a first operator input signal for average speed and direction and the second operator input device generating a second operator input signal for the specific speeds of the first and second motors, wherein the central computer is adapted to control the speed and direction of the first and second motors through the control circuit based on the first and second operator input signals.

* * * * *